US006266776B1

United States Patent
Sakai (10) Patent No.: US 6,266,776 B1
(45) Date of Patent: Jul. 24, 2001

(54) ACPI SLEEP CONTROL

(75) Inventor: Makoto Sakai, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/199,439

(22) Filed: Nov. 25, 1998

(30) Foreign Application Priority Data

Nov. 28, 1997 (JP) ...................................... 9-329210

(51) Int. Cl.[7] .............................. G06F 1/26; G06F 1/28; G06F 1/30
(52) U.S. Cl. ........................ 713/300; 713/310; 713/320; 713/321; 713/322; 713/323; 713/324; 713/330; 713/340
(58) Field of Search ..................... 713/300–340

(56) References Cited

U.S. PATENT DOCUMENTS

| | | |
|---|---|---|
| 5,218,607 | 6/1993 | Saito et al. . |
| 5,379,435 | 1/1995 | Hanaoka . |
| 5,471,624 | 11/1995 | Enoki et al. . |
| 5,511,205 | 4/1996 | Kannan et al. . |
| 5,623,677 | 4/1997 | Townsley et al. . |
| 5,710,931 | 1/1998 | Nakamura et al. . |
| 5,878,264 | * 3/1999 | Ebrahim ................. 713/323 |
| 5,999,730 | * 12/1999 | Lewis ..................... 395/702 |
| 6,105,142 | * 8/2000 | Goff et al. ............... 713/324 |

FOREIGN PATENT DOCUMENTS

| | | |
|---|---|---|
| 6-175754 | 6/1994 | (JP) . |
| 9-97128 | 4/1997 | (JP) . |
| 9-128106 | 5/1997 | (JP) . |

OTHER PUBLICATIONS

Intel/Microsoft/Toshiba, Advanced Configuration and Power Interface Specification Revision 1.0, Dec. 22, 1996, pp. 1–265.

* cited by examiner

*Primary Examiner*—Rupal Dharia
(74) *Attorney, Agent, or Firm*—Finnegan, Henderson, Farabow, Garrett, & Dunner, L.L.P.

(57) ABSTRACT

When the state of an internal battery or an external power supply changes, the change is detected by an embedded controller. The OS is informed of this change using a power management event signal POWER_PME and an SCI interrupt. In accordance with the change in power supply state by the internal battery or the external power supply, the current system state changes to another system state. Accordingly, the system state can dynamically change between sleep states in accordance with a change in power supply state of the computer. Trade-off between shortening of the time interval from a sleep state to system activation, and power saving during sleep can be optimized.

11 Claims, 6 Drawing Sheets

| USER POLICY | SYSTEM STATE TRANSITION | TRANSITION CONDITION | |
|---|---|---|---|
| | | BATTERY | AC ADAPTER |
| A | S1→S3 | | |
| | S1→S4 | | |
| | S3→S1 | | |
| | S3→S4 | | |
| | S4→S1 | | |
| | S4→S1 | | |
| B | | | |
| | | | |
| | ⋮ | ⋮ | ⋮ |
| C | | | |
| | | | |
| | ⋮ | ⋮ | ⋮ |

ACPI SLEEP CONTROL

BACKGROUND OF THE INVENTION

This application is based on Japanese Patent Application No. 9-329210, filed Nov. 28, 1997, the content of which is incorporated herein by reference.

The present invention relates to a computer system and a system state control method and, more particularly, to a computer system having ON and OFF states and a plurality of sleep states between them as system states, and a system state control method for changing the system state.

Various battery drivable personal computers represented by a notebook type computer have recently been developed. In personal computers of this type, power management techniques have been studied for low power consumption and a short ON state return time. One of these techniques is ACPI (Advanced Configuration and Power Interface) specifications.

The ACPI specifications define ON and OFF states, and in addition a plurality of sleep states between them as system states.

More specifically, the ACPI specifications define system states S0 through S5. S0 is an ON state (i.e., the system is turned on, and software is in process). S5 is an OFF state (i.e., execution of all software is complete, and the system is turned off). S1 through S4 are intermediate states (called sleep states; i.e., the preceding execution state of software is maintained, but the operation stops).

In S1, the contents (contexts) of all the components (e.g., CPU, system memory, and chip sets) of the system, and their power supplies are maintained, and thus the power consumption is maximum of all the sleep states. However, S1 can immediately return to S0. That is, S0 is the "lightest" sleep state. Note that the light sleep state cannot be maintained for a long time in the battery-driven state of a notebook type personal computer or the like.

S2 is different from S1 in that the power supplies of the CPU and the system cache are turned off (and their contents are lost). The necessary power consumption is therefore reduced.

In S3, the power supply of only the system memory (and some chip sets) is maintained. That is, the contents of only the system memory (and some chip sets) are maintained. The necessary power supply is much smaller, so that the sleep state can be maintained for a long time in the battery-driven state.

In S4, the contents of all the system memory and other components are stored in a non-volatile storage such as a hard disk, and the system power supply is entirely turned off. The power consumption is minimum (equal to S5) of all the sleep states, but it takes the longest time to return to S0. That is, S4 is the "deepest" sleep state.

In return to S0 from S2 through S4, the lost contents in the system are restored because they are stored before transition to each sleep state. Therefore, upon return to S0, software can continuously operate.

The power consumption relationship between the system states, and the relationship of the return time to S0 are as follows:

Power Consumption: S0>S1>S2>S3>S4>S5

Return Time: S1<S2<S3<S4<S5

However, in the current ACPI specifications, no consideration is made to change the depth of the sleep state in accordance with a change in power supply state during sleep. For example, a battery-driven notebook type PC cannot change to such an appropriate sleep state as to minimize the battery consumption. When the battery changes to a low battery state (current sleep state cannot be maintained) in a light sleep state, the sleep state cannot change to a deeper sleep state.

BRIEF SUMMARY OF THE INVENTION

It is an object of the present invention to provide a computer system and system state control method capable of dynamically changing the depth of a sleep state in accordance with a change in power supply state during sleep, and always setting the system state in an optimum sleep state.

To achieve the above object, according to the present invention, there is provided a computer system having ON and OFF states and a plurality of sleep states between the ON and OFF states, comprising means for detecting a change in power supply state of the computer system, and sleep state transition means for, when a change in power supply state is detected while the computer system is in any one of the plurality of sleep states, changing the sleep state of the computer system between the plurality of sleep states in accordance with the change in power supply state.

According to the computer system of the present invention, when a change in power supply state is detected while the computer system is in a sleep state, switching of the sleep state is dynamically changed in accordance with the changed power supply state.

Assume that the user who uses a notebook type PC complying with ACPI specifications (i.e., driven by an AC adapter) in office changes the PC to state S1 before going home and leaves the office. The last person turns off the circuit breaker of the office and leaves the office. Then, the user's PC maintains state S1 using its battery. However, the battery may be dead before next morning. The user may use the PC while carrying it. Therefore, the battery power consumption must be minimized. For this purpose, when the system detects the OFF of the external power supply via the AC adapter, the system automatically changes the PC from state S1 to state S3, thereby reducing the battery power consumption. Next morning, when the first person who got office turns on the circuit breaker, the system detects that the external power supply via the AC adapter is turned on again, and returns the PC to state S1 again. The user can resume use of the PC (in state S0) from state S1 without knowing that the PC is in state S3 at night. In other words, the system requires a long time to return the PC from S3, but allows the user to use the PC within the shortest time without making the user conscious of this.

In this manner, the method of automatically changing the system state between sleep states in accordance with a change in power supply state. Trade-off between shortening of the time interval from a sleep state to system activation, and power saving during sleep can be optimized.

The system state can change between sleep states bidirectionally, i.e., from a light sleep state to a deep sleep state and from a deep sleep state to a light sleep state.

The system state can change not only between two sleep states but also between a plurality of sleep states stepwise in accordance with a change in power supply state.

The sleep state changes more preferably after the lapse of a predetermined time than immediately after a change in power supply is detected. In this case, if the power supply state returns to the original state within the predetermined time, the sleep state does not change.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

An embodiment of the present invention will be described below with reference to the several views of the accompanying drawing.

Figure 1:
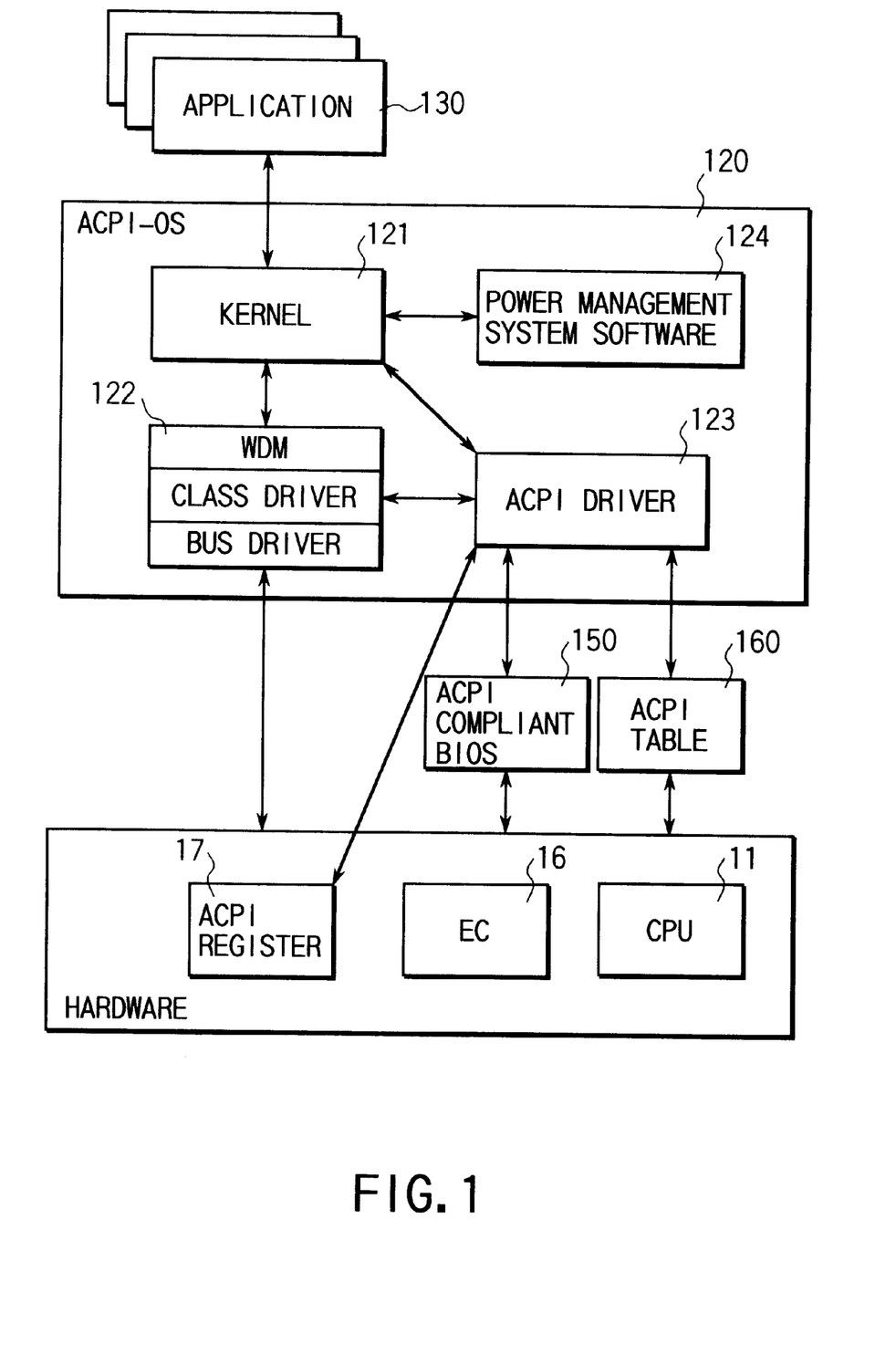
FIG. 1 is a block diagram showing the arrangement of a computer system according to an embodiment of the present invention.

FIG. 1 is a block diagram showing the arrangement of a computer system according to an embodiment of the present invention. This computer system is a battery drivable notebook type personal computer, and incorporates an ACPI as a power management architecture developed by Intel Corp., U.S.A., Microsoft Corp., U.S.A., and TOSHIBA CORP., Japan. In the ACPI specifications, power to various hardware devices on the mother board is directly managed by an operating system (ACPI-OS) 120.

As shown in FIG. 1, the ACPI-OS 120 comprises a kernel 121, device drivers 122, an ACPI driver 123, and power management system software 124. The device drivers 122 are standard power management interfaces, and include a driver (class driver) for managing each device, a driver (bus driver) for managing a bus (PCI bus or USB), and a device driver complying with a WDM (Windows Driver Model). The ACPI driver 123 controls power to hardware by using an ACPI compliant BIOS 150, an ACPI table 160, and an ACPI register 17. The ACPI table 160 defines a hardware interface, and describes hardware characteristics using a language called ASL (ACPI control method Source Language) executable by the operating system. That is, the ACPI-OS 120 has an ACPI machine language (AML; ACPI control method Machine Language) interpreter. The ASL is compiled to an AML code, which is stored in the ACPI table 160. Power to hardware is actually managed using an ACPI register 17 corresponding to the device. The power management system software 124 is constituted by system codes of the ACPI-OS 120 and executes a power management task.

Figure 2:
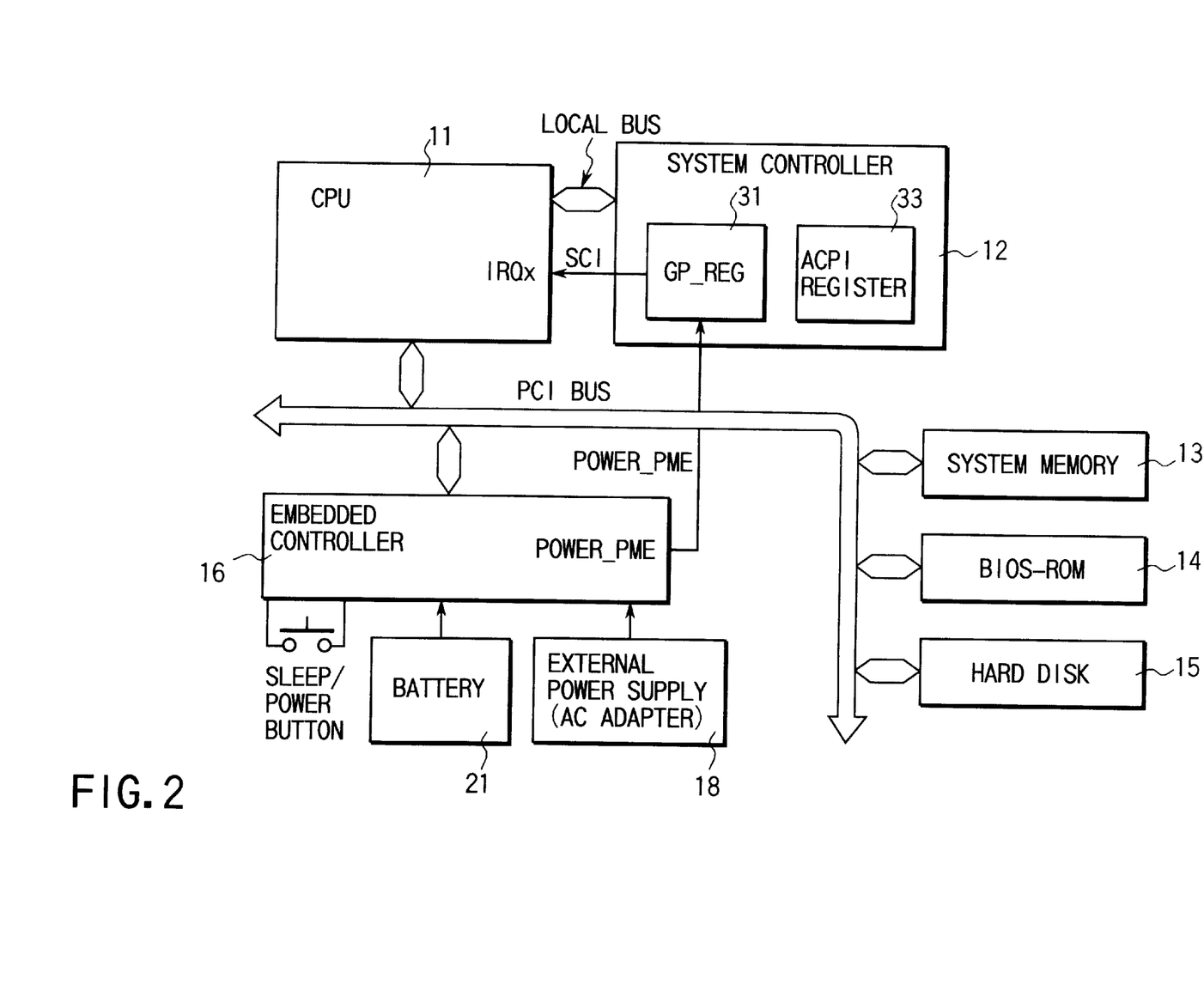
FIG. 2 is a block diagram showing the hardware arrangement of the computer system according to this embodiment.

FIG. 2 is a block diagram showing the hardware arrangement of the computer system according to this embodiment.

This computer system incorporates a battery 21, and can operate by power from the battery 21. The computer system can also receive power from an external power supply 18 such as an AC commercial power supply via an AC adapter. While the computer system receives power from the external power supply 18, the external power supply 18 is used as a computer system operation power supply. At this time, power from the external power supply 18 automatically charges the battery 21. When the AC adapter is removed, or the AC commercial power supply circuit breaker is turned off, the battery 21 is used as a computer system operation power supply.

The system in FIG. 2 comprises a CPU 11, a system controller 12, a system memory 13, a BIOS-RON 14, a hard disk drive 15, and an embedded controller (EC) 16.

The CPU 11 controls the whole operation of the system, and executes programs such as an application, program 130, the ACPI-OS 120, and the ACPI compliant BIOS 150.

The system controller 12 is an AS1C for controlling a system memory and an I/O, and comprises an event/status register (GP_REG) 31 for controlling generation of an interrupt signal SCI (System Control Interrupt) used to inform the ACPI-OS 120 of a power management event (to be referred to as a PME hereinafter), and an ACPI register 33 used for power management by the ACPI-OS 120.

The system memory 13 is a main memory storing the ACPI-OS 120, an application program 130 to be processed, and user data created by the application program 130 including utilities.

The BIOS-ROM 14 stores a system BIOS, and is constituted by a programmable and erasable flash memory. The system BIOS can operate in a real mode. The system BIOS includes a BIOS-IRT routine executed upon booting the system, BIOS drivers for controlling various I/O devices, and an SM-BIOS for ACPI compliant power management in an SMM (System Management Mode).

The hard disk drive 15 stores the ACPI-OS 120, the application program 130 including utilities, and data and files that are processed by the CPU 11.

The embedded controller (EC) 16 controls an electrical circuit to supply power to each system unit, monitors a change in power supply state, and informs the CPU 11 of the change as a power management event. The embedded controller 16 monitors the power supply state even during sleep.

The power management event includes the low battery state of the battery 21, restoration of the low battery state, and a change in power supply start/stop state of the external power supply 18.

More specifically, power supply events, such as the power supply start/stop state of the external power supply 18 (ON/OFF of the AC adapter), and a warning (low battery) representing a small residual capacity of the battery 21, are detected by the embedded controller 16 and summed up as a POWER_PME signal. The POWER_PME signal is transmitted as occurrence of a power supply event to the system controller 12. The system controller 12 incorporates the event/status register (GP_REG) 31, as described above.

In the GP_REG 31, one bit is set upon reception of POWER_PME.

The GP_REG 31 sums up factors informing the ACPI-OS 120 of SCIs. If any bit is set in the GP_REG 31, the system controller 12 generates an SCI signal. The SCI signal is mapped into one IRQ interrupt signal, and finally transferred as an interrupt request to the CPU 11 (i.e., the ACPI-OS 120). The function and structure of the GP_REG 31, and a means for assigning the SCI signal to any IRQ channel and receiving an event by the ACPI-OS 120 upon occurrence of an interrupt, i.e., a means for informing the ACPI-OS 120 of occurrence of an event are well known in the ACPI specifications, and a detailed description thereof will be omitted.

Figure 3:
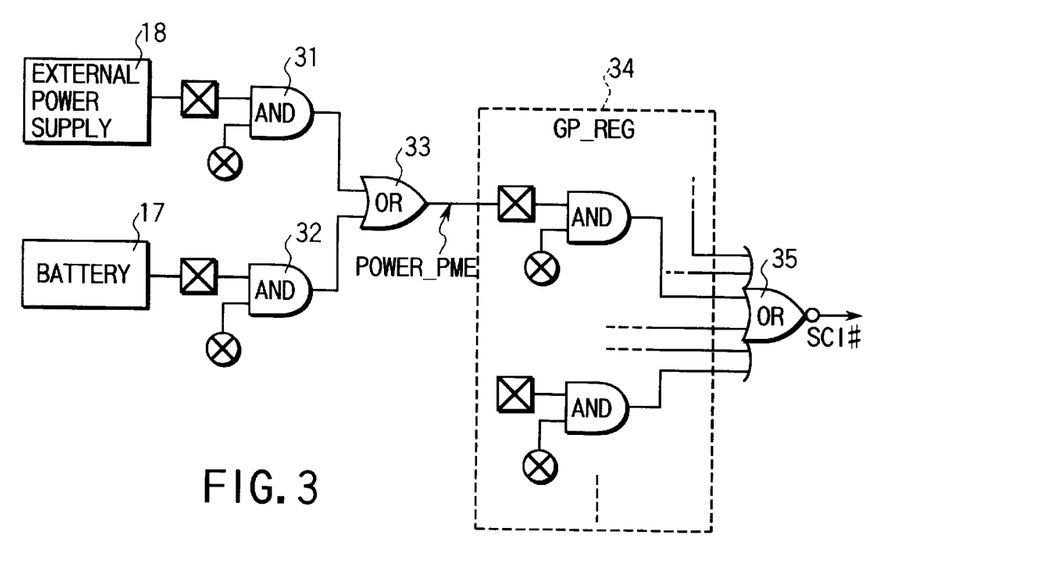
FIG. 3 is a diagram showing a hardware logic for detecting and informing a power management event in the system of this embodiment.

FIG. 3 is a diagram showing a hardware logic for detecting and informing a power management event in the system of this embodiment.

FIG. 3 is drawn based on a notation widely used for a logic notation in the ACPI specifications. That is, the cross in a square represents a flip-flop (register) which is set ("1") by hardware upon occurrence of an event factor and reset ("0") after the ACPI-OS 120 writes "1". The ACPI-OS 120 can read the value (status) of the flip-flop. The flip-flop is used to allow the ACPI-OS 120 to acquire information about occurrence of an event. The cross in a circle represents an enable register for controlling the effectiveness/ineffectiveness of a corresponding event. When the ACPI-OS writes "1" in the enable register, and the flip-flop is set upon occurrence of a corresponding event factor, a corresponding AND gate (31 or 32) outputs "1" (i.e., an event occurs). A plurality of events are summed up as one event (POWER_PME signal in FIG. 3) by an OR gate (33). The POWER_PME signal is input to an upper event/status register. In this embodiment, the event factor includes only an external power supply state event to be processed in this embodiment, and a battery state event, but may include other event factors.

The GP_REG is the highest event/status register, as described, and is directly accessed by the ACPI-OS 120. A plurality of events in the GP_REG are summed up as one event by an ON gate (35), and the obtained event is finally transmitted as an SCI# signal (described with a negative polarity because the signal is generally active low). That is, an SCI interrupt is input to the ACPI-OS 120. In this embodiment, one event is input as the POWER_PME signal to the GP_REG, but event factors may be individually, directly input to the GP_REG. Alternatively, the POWER_PME signal may be input to the GP_REG via a larger number of event/status registers.

Note that the logic on the left side of the GP_REG in FIG. 3 (logic for processes up to generation of the POWER_PME signal) may be realized by hardware or software (e.g., described in a program within the embedded controller). These registers are accessed by the ACPI-OS 120 not directly but indirectly via an interpreter language called an AML code. The AML code is described in detail in the ACPI specifications, and a description thereof will be omitted. In this embodiment, processes up to generation of the POWER_PME signal are realized by software in the embedded controller 16. Processes up to generation of the SCI signal from the POWER_PME signal are realized by the system controller 12.

FIG. 3 shows an event caused by a change in state of the external power supply 18, and an event caused by a change in state of the battery 21, as described. These events are caused by "changes in states". The current state can be acquired from, e.g., a status register in the system controller 12. As for an event caused by a change in state of the external power supply 18, when the AC adapter starts (ON) or stops (OFF) supplying power, a higher register is informed of the event as the same event factor. In addition, the current power supply state of the AC adapter can be read. A higher register may be informed of the ON and OFF events using two independent pairs of event/status registers. Alternatively, the polarity of an event factor signal may be set selectable and toggled upon occurrence of each event. These methods can be realized by appropriately selecting a plurality of known techniques. An event caused by a change in battery is similarly processed.

The method of informing the ACPI-OS 120 of occurrence of an event as an SCI interrupt has been described. When (all or part of) the power supply of a PC is OFF in a sleep state, occurrence of an event is detected by the embedded controller 16. The embedded controller 16 supplies minimum power necessary for the ACPI-OS 120 to operate. Then, the embedded controller 16 informs occurrence of the event to the ACPI-OS 120 via the system controller 12. When the event is disabled by a corresponding event enable register, no process is performed even upon occurrence of an event. That is, the system is kept in a sleep state.

Figure 4:
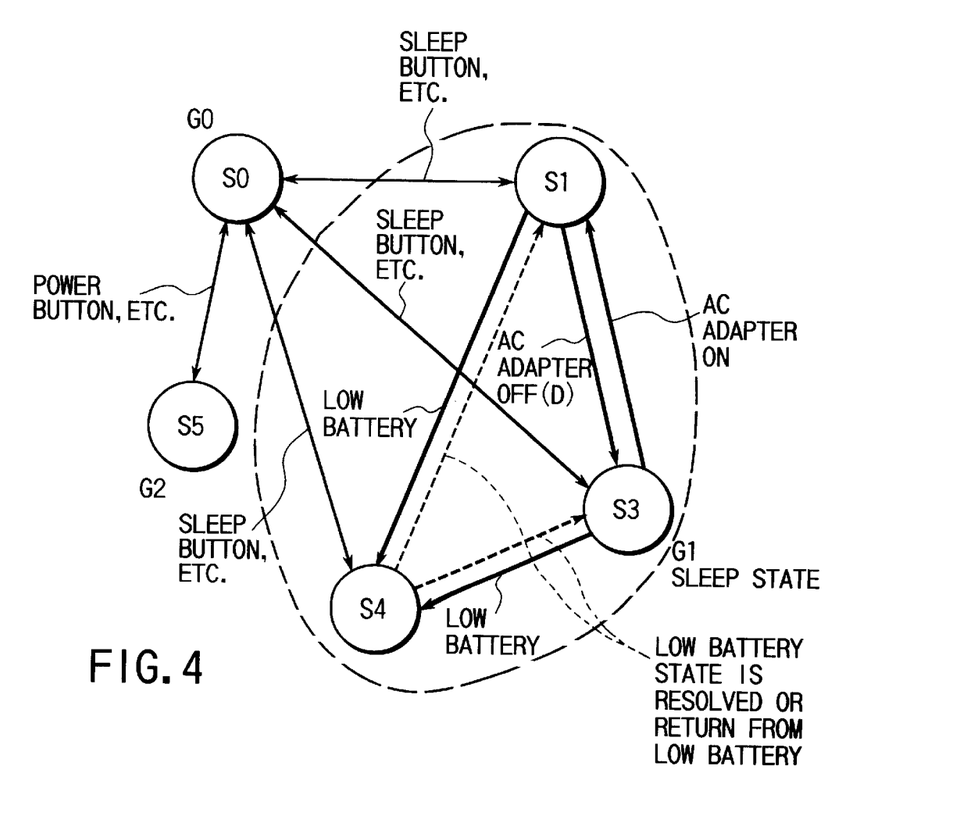
FIG. 4 is a view showing the state transition of the system used in this embodiment.

FIG. 4 is a view showing the state transition of the system used in this embodiment.

The user can know only global system states (G0, G1, and G2) defined in the ACPI specifications as system states. G0 is equivalent to S0, and G2 is to S5. All the sleep states (S1 through S4) are represented by G1 for the user. However, this embodiment does not describe S2 for the sake of simplicity. In the ACPI specifications, the system suffices to support any one or more sleep states. A sleep state supported by the system can be freely determined by the system designer.

In G1, the ACPI-OS 120 determines an actual sleep state on the basis of a user policy and an OS policy. The user policy is abstractly represented such that "I want to shorten the sleep return time" or "I want to save the battery". The user request is transmitted to the ACPI-OS 120. The OS policy is determined by the ACPI-OS 120 itself on the basis of the use state of the user or the state of the device, such as "the use frequency by the user is low", "the PC is often driven with a battery", or "device xx is in an idle state". The ACPI-OS 120 synthetically determines these policies and selects one sleep state at last. The above setting, representation, and determination methods of policies are merely examples, and another method can be adopted.

A transition condition between G0 and G1 shown as "sleep button, etc." in the state transition view is well known in the ACPI specifications. For example, when the user presses the sleep button (the sleep button may be a power supply button, or the user may request a sleep state using software by, e.g., clicking a sleep icon on the screen with the mouse), or the ACPI-OS 120 detects that the PC is in an idle state for a predetermined time, the current state changes to a sleep state, which is determined by the above policies. Although not shown, e.g., state S1 may change to a deeper sleep state (e.g., S3) after the PC is in an idle state for a predetermined time. Similarly, a transition condition between G0 and G2 shown as "power supply button, etc." in the state transition view is also well known in the ACPI specifications. Although not shown, G1 may change to G2 (generally called shutdown). Shutdown occurs when the PC is set with such a policy as to automatically shut down the PC in a sleep state after a predetermined time, or state G1 cannot be maintained due to a low battery in states S1 through S3 during battery driving in a system not supporting S4.

An example of state transition control in this embodiment will be explained.

Assume that the user sets the PC in a sleep state (G1 for the user) before going home or leaving the user's desk. The ACPI-OS 120 determines on the basis of various policies that "the external power supply is ON via the AC adapter (i.e., the PC can consume power during sleep), and the user expects to quickly activate the PC". The ACPI-OS 120 changes the PC to state S1.

In state S1, when the external power supply is turned off ("AC adapter OFF" in FIG. 4), and occurrence of an SCI interrupt caused by this event factor is enabled in advance, the embedded controller 16 transmits the SCI interrupt request to the ACPI-OS 120 via the POWER_PME. The ACPI-OS 120 knows that the external power supply is turned off, and determines the next operation based on policies. In this embodiment, S1 changes to S3. That is, the embedded controller 16 stops power supply to unnecessary portions. This reduces the power consumption for maintaining the sleep state. Note that the current sleep state changes to the next sleep state immediately after the external power supply is turned off, but may change after the lapse of a predetermined time ("AC adapter OFF (D)" in FIG. 4). In this case, for example, if the user plugs out the AC adapter for a short time in order to move the PC to another close place, the sleep state can be prevented from transition during short-time OFF of the power supply. Otherwise, even when the user temporarily plugs out the AC adapter of the PC in a light sleep state, plugs it in again at the (close) place, and tries to use the PC, the PC which changes to a deep sleep state during movement cannot be quickly activated (return), and the idle time becomes long because transition of the sleep state requires a long time. The transition delay time can be defined in accordance with the use environment of the user by policies, similar to other conditions. As a delay method, for example, the embedded controller 16 comprises a timer, counts the time using occurrence of an event as a trigger (while maintaining the original sleep state), and informs the ACPI-OS 120 of the event after the lapse of a predetermined time. Alternatively, the ACPI-OS 120 comprises a timer and delays transition to the next sleep state. In terms of the power consumption, the former is more desirable. However, the latter can enable advanced determination or processing. If an event factor is canceled (in this embodiment, the power supply is turned on again), all processes are interrupted, and the PC returns to the original sleep state.

In step S3, when the external power supply is turned on again ("AC adapter ON" in FIG. 4), and occurrence of an SCI interrupt caused by this event factor is enabled in advance, the embedded controller 16 supplies power to the minimum number of portions allowing the ACPI-OS 120 to operate, and then transmits the SCI interrupt request to the ACPI-OS 120 via the POWER_PME. The ACPI-OS 120 knows that the external power supply is turned on again, and determines the next operation based on policies. In this embodiment, S3 changes to S1.

In state S1 or S3, if the PC changes to a low battery state, and occurrence of an SCI interrupt caused by this event factor is enabled in advance, the embedded controller 16 supplies power to the minimum number of portions allowing the ACPI-OS 120 to operate, and then transmits the SCI interrupt request to the ACPI-OS 120 via the POWER_ PME. The ACPI-OS 120 knows that the PC changes to a low battery state, and determines the next operation based on policies. In this embodiment, S1 or S3 changes to S4. That is, the embedded controller 16 finally turns off the system power supply. After the low battery state is resolved (e.g., the external power supply is turned on again), S4 can freely change to a lighter sleep state (S1 or S3) again depending on policies, as indicated by the dotted lines in FIG. 4.

Figure 5:
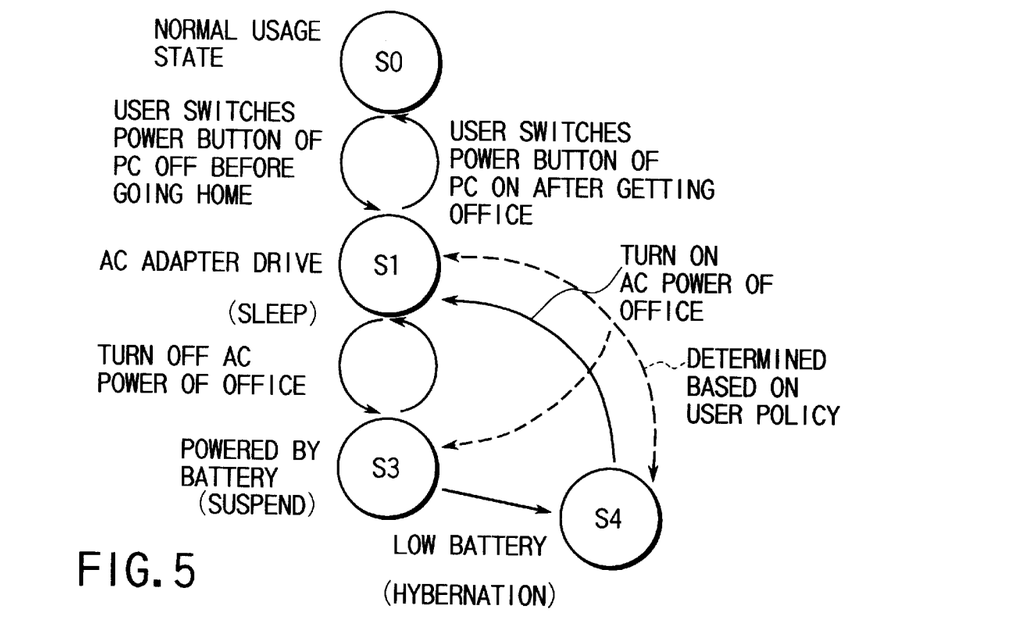
FIG. 5 is a state transition view showing detailed system state transition in the system according to the embodiment.

FIG. 5 shows state transition based on a concrete case.

Assume that the user who uses a notebook type PC complying with ACPI specifications (i.e., driven by an AC adapter) in office changes the PC to state S1 before going home and leaves the office. The last person turns off the circuit breaker of the office and leaves the office. When the system detects the OFF of the external power supply via the AC adapter, it automatically changes the PC from state S1 to state S3. In state S3, the system backs up the contents of the system memory 13 using the battery 21. In this state, if the residual capacity of the battery 21 decreases, and the battery 21 changes to a low battery state, the system automatically changes the PC from state S3 to state S4. In state S4, the system saves the contents of the system memory 13 in the hard disk drive 15, and turns off all the system power supplies.

Next morning, when the first person who got office turns on the circuit breaker, the system detects that the external power supply via the AC adapter is turned on again, and returns the PC to state S1 again. At the same time, the battery is charged. The user can resume use of the PC (in state S0) from state S1 without knowing that the PC is in state S3 or S4 at night. In other words, the system requires a long time to return the PC from S3 or S4, but allows the user to use the PC within the shortest time without making the user conscious of this.

In office where the AC power supply of the office is kept off at night, even if the user changes the PC to S1 before going home and leaves the office, the PC automatically changes to S3 at night (i.e., while the AC power supply of the office is kept off), thereby reducing the battery consumption. If the battery becomes almost dead, the PC changes to S4 to maintain the sleep state. Next morning, when the AC power supply of the office is turned on again, the PC returns to S1 (the battery is charged). When the user gets office, the PC has returned to the original state. The user can resume use of the PC without being conscious of the state at night.

The transition destination of the system state in a given power supply state is determined based on the user policy.

Figure 6:
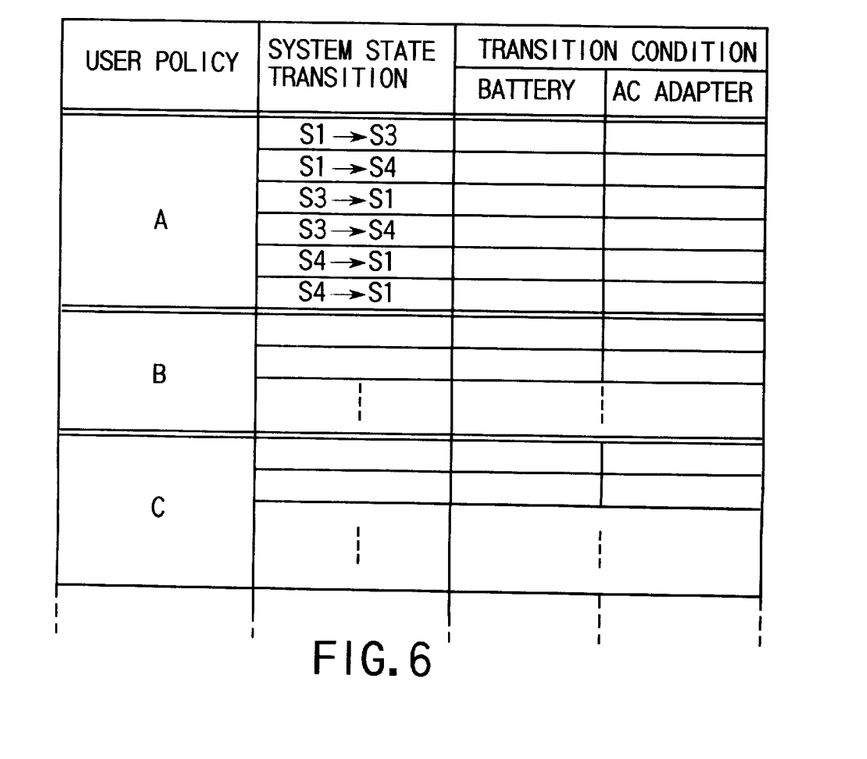
FIG. 6 is a view showing a relationship between a user policy and a transition condition to be used in the system according to the embodiment.

FIG. 6 shows an example of the relationship between the user policy and the transition condition.

FIG. 6 defines state transition to be executed and its transition condition for each of user policies "A", "B", and "C". The transition condition is specified by battery conditions (a low battery and restoration of a low battery) and external power supply conditions (start and stop of power supply).

Figure 7:
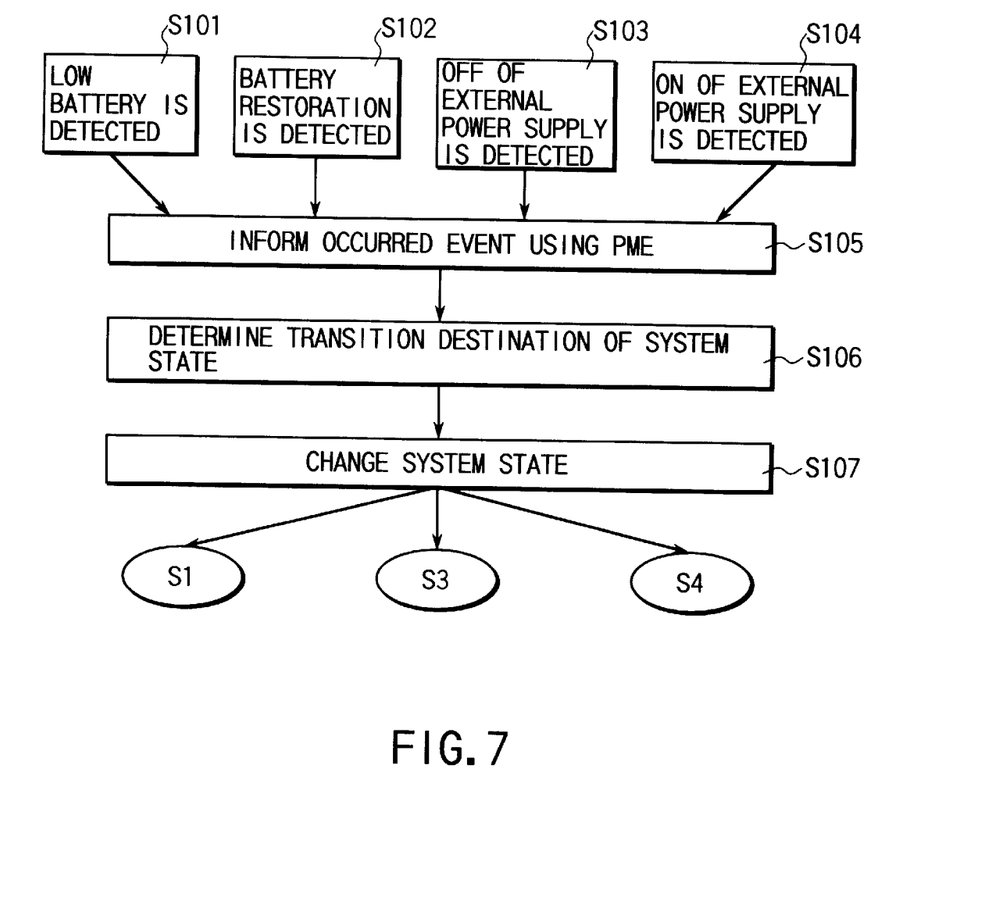
FIG. 7 is a flowchart showing steps of a system state control method to be applied to the system according to the embodiment.

A system state control method used in this embodiment will be described with reference to a flow chart in FIG. 7.

While the system is in state G1, if one of a low battery state, restoration of a low battery state, and the OFF or ON of the external power supply is detected (steps S101 through S104), a higher system is informed of the event using a POWER_PME signal, and the ACPI-OS 120 is finally informed of the current power supply state using an SCI (step S105). After that, the transition destination of the system state is determined from the changed power supply state and the user policy (step S106). The system state is dynamically changed to one of S1, S3, and S4 (step S107).

Figure 8:
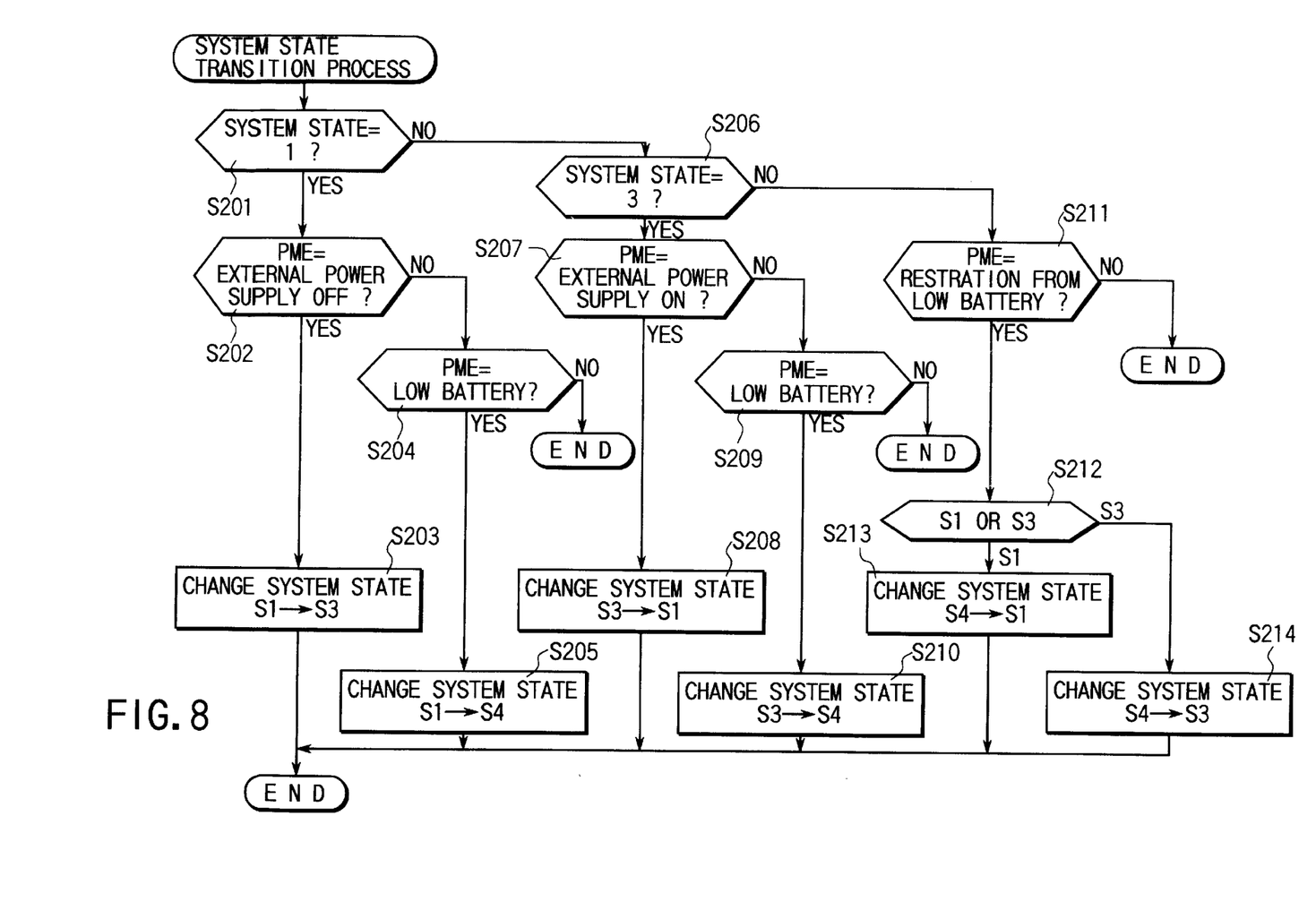
FIG. 8 is a flowchart showing steps of a system state change process to be applied to the system according to the embodiment.

FIG. 8 shows an example of the detailed procedure of the system state change process.

The system state change process in FIG. 8 corresponds to the state transition in FIG. 4.

More specifically, upon occurrence of a power supply event, whether the current system state is S1 is checked (step S201). If YES in step S201, whether the power supply event is caused by the OFF of the external power supply or a low battery is checked (steps S202 and S204). If YES in step S202, the system state changes from S1 to S3 (step S203). If YES in step S204, the system state changes from S1 to S4 (step S205).

If NO in step S201, whether the current system state is S3 is checked (step S206). If YES in step S206, whether the power supply event is caused by the ON of the external power supply or a low battery is checked (steps S207 and S209). If YES in step S207, the system state changes from S3 to S1 (step S208). If YES in step S209, the system state changes from S3 to S4 (step S210).

If NO in steps S201 and S206, the current system state is determined to be S4. In this case, whether the power supply event is caused by restoration of a low battery is checked (step S211). If YES in step S211, whether the transition destination is S1 or S3 is determined on the basis of the system state before S4 or the user policy (step S212). If the transition destination is S1, the system state changes from S4 to S1 (step S213). If the transition destination is S3, the system state changes from S4 to S3 (step S214).

According to this system state change process, when the system state changed upon occurrence of a given transition condition, the system state can return to the original system state before transition upon cancellation of the transition condition. The system state can change bidirectionally or stepwise between many system states.

This embodiment has exemplified only transition between S1 and S3 caused by the ON state of the external power supply and transition between S1, S3, and S4 caused by a low battery state. However, transition between other sleep states, and setting of the delay time for various transition operations can be easily defined in the design policy of the system designer and the ACPI-OS policy.

Although the ACPI-OS controls the system state in this embodiment, the present invention can be easily applied to other OSs each having a similar structure. Even when an OS itself does not have a power management function, a sleep system state can be dynamically changed in accordance with a change in power supply state under the control of a system BIOS.

As has been described above, according to the present invention, the depth of a sleep state can be dynamically changed in accordance with a change in power supply state during sleep, and the system state can be always automatically set in an optimum sleep state. Therefore, trade-off between shortening of the time interval from a sleep state to system activation, and power saving during sleep can be optimized.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer system having ON and OFF states and a plurality of sleep states between the ON and OFF states, comprising:

means for detecting a change in power supply state of said computer system; and sleep state transition means for, when a change in power supply state is detected while said computer system is in any one of the plurality of sleep states, changing the sleep state of said computer system between the plurality of sleep states without returning to the ON state in accordance with the change in power supply state.

2. A system according to claim 1, wherein said means for detecting a change in power supply state comprises means for detecting, as a change in power supply state, presence/absence of a low battery state of a battery arranged in said computer system, and said sleep state transition means changes the sleep state of said computer system in accordance with detection of the low battery state and detection of restoration of the low battery state.

3. A system according to claim 1, wherein said means for detecting a change in power supply state comprises means for detecting, as a change in power supply state, presence/absence of power supply from an external power supply to said computer system, and said sleep state transition means changes the sleep state of said computer system in accordance with a change in power supply state from the external power supply.

4. A system according to claim 1, wherein said computer system has first and second sleep states different in an ON state return time and power consumption; and said sleep state transition means changes said computer system from the first sleep state to the second sleep state upon detection of a change in power supply state corresponding to a state transition condition from the first sleep state to the second sleep state while said computer system is in the first sleep state, and returns said computer system to the first sleep state when the state transition condition from the first sleep state to the second sleep state is canceled while said computer system is in the second sleep state.

5. A system according to claim 1, wherein said means for detecting a change in power supply state comprises means for detecting presence/absence of a low battery state of a battery arranged in said computer system, and means for detecting presence/absence of power supply from an external power supply to said computer system, and said sleep state transition means dynamically changes the sleep state of said computer system between the plurality of sleep states on the basis of a combination of the battery state and the power supply state of the external power supply which are detected by said means for detecting a change in power supply state.

6. A system according to claim 1, wherein said computer system further comprises means for keeping a sleep state change process by said sleep state transition means waiting until a predetermined period of time elapses upon detection of a change in power supply state of said computer system, and the sleep state change process by said sleep state transition means stops when the power supply state returns to an original state within the predetermined period of time.

7. A computer system having ON and OFF states and a plurality of sleep states between the ON and OFF states, comprising:

means for detecting occurrence of an event corresponding to a state transition condition between the plurality of sleep states; and means for executing state transition between the sleep states without returning to the ON state in accordance with the event when occurrence of the event is detected while said computer system is in any one of the plurality of sleep states.

8. A system state control method for a computer system having ON and OFF states and a plurality of sleep states between the ON and OFF states, comprising the steps of:

detecting a change in power supply state of said computer system;

when a change in power supply state is detected while said computer system is in any one of the plurality of sleep states, changing the sleep state of said computer system without returning to the ON state in accordance with a detection result; and changing the sleep state of said computer system between the plurality of sleep states without returning to the ON state in accordance with the change in power supply state.

9. A method according to claim 8, further comprising the steps of:

changing said computer system from a first sleep state to a second lower-power-consumption sleep state when a stop of power supply from an external power supply to said computer system is detected while said computer system is in the first sleep state; and returning said computer system from the second sleep state to the first sleep state when the power supply of the external power supply resumes.

10. A method according to claim 8, further comprising the steps of:

changing said computer system from a first sleep state to a second lower-power-consumption sleep state when a low battery state of a battery arranged in said computer system is detected while said computer system is in the first sleep state; and returning said computer system from the second sleep state to the first sleep state when restoration of the low battery state of the battery is detected.

11. A system state control method for a computer system having ON and OFF states and a plurality of sleep states between the ON and OFF states, comprising the steps of:

detecting the occurrence of an event corresponding to a state transition condition between the plurality of sleep states; and executing state transition between the sleep states without returning to the ON state in accordance with the event when occurrence of the event is detected while said computer system is in any one of the plurality of sleep states.

* * * * *